H. L. STOKER.
DOG MUZZLE.
APPLICATION FILED OCT. 17, 1919.
1,351,140. Patented Aug. 31, 1920.
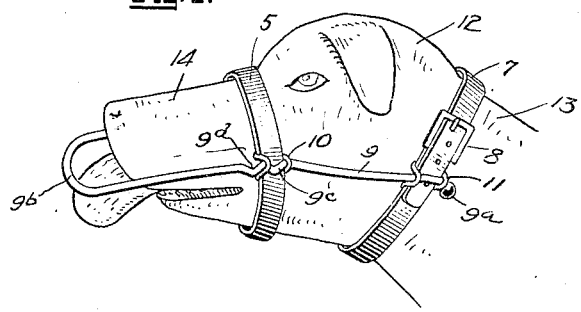
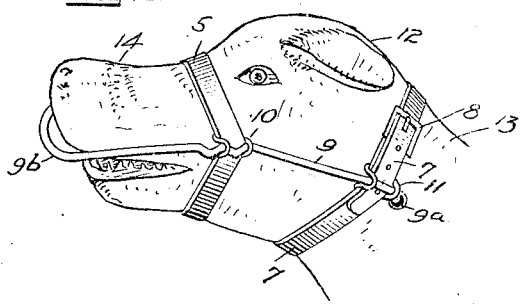
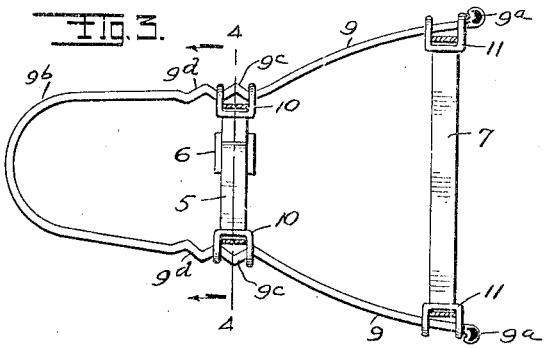
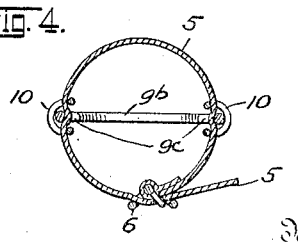
Inventor
HENRY L. STOKER
By his Attorney
Walton Harrison

UNITED STATES PATENT OFFICE.

HENRY LESPINASSE STOKER, OF NEW YORK, N. Y.

DOG-MUZZLE.

1,351,140.  Specification of Letters Patent.  Patented Aug. 31, 1920.

Application filed October 17, 1919. Serial No. 331,442.

*To all whom it may concern:*

Be it known that I, HENRY LESPINASSE STOKER, a citizen of the United States, residing at New York city, county of Bronx, and State of New York, have invented certain new and useful Improvements in Dog-Muzzles, of which the following is a full, clear, and concise description.

My invention relates to dog muzzles, the purpose of my improvement being to produce a muzzle which when worn by a dog, thoroughly prevents him from biting and yet does not detract materially from his comfort, and allows him considerable freedom.

More particularly stated, I seek to give the muzzle such form and arrangement that while it is worn by the dog it is normally loose and flexible, yet if the animal becomes vicious and tries to bite, the dog's own muscular efforts cause the muzzle to suddenly become tight and consequently rigid in such manner as to practically close the dog's mouth.

I also seek to give the muzzle such form as to simplify its construction and cheapen the cost of its manufacture, and even to enable some parts of it to be worked up out of scrap material.

In addition, I seek to give the muzzle a certain amount of adjustability, for enabling it to be used upon dogs of different sizes and various kinds.

Reference is made to the accompanying drawing forming a part of the specification, and in which like reference characters indicate like parts throughout the several figures.

Figure 1 is a perspective showing my improved muzzle as worn by a dog and as used under normal conditions.

Fig. 2 is a perspective showing the muzzle as it appears when the dog makes an effort to bite.

Fig. 3 is a substantially horizontal section through the muzzle.

Fig. 4 is a section on the line 4—4 of Fig. 3, looking in the direction indicated by the arrows.

The construction of the muzzle is shown more particularly in Figs. 3 and 4.

A snout strap is shown at 5, and is made of leather, canvas, wicking, or other soft and flexible material appropriate for the purpose and possessing sufficient tensile strength. The snout strap as a whole is approximately circular in form as may be understood from Fig. 4. It carries a buckle, whereby it may be let out or taken in, so as to change its general diameter and thus adapt it to be fitted accurately and to render the muzzle adjustable.

A neck strap appears at 7, and though of greater general diameter than the snout strap 5 is otherwise of substantially similar construction thereto. It is provided with a buckle 8 whereby it is rendered adjustable.

A U-frame 9, made of a single piece of stout wire, serves as a part of the muzzle and as a framework for supporting other parts thereof. This U-frame is provided at its ends with terminal heads 9ª, conveniently formed by merely heading up the ends of the wire.

The U-frame is further provided with a bow-shaped portion 9ᵇ, and with a few kinks 9ᶜ, 9ᵈ, or slight bends. The kinks are arranged in pairs, as indicated in Fig. 4, the kinks 9ᶜ constituting one pair and the kinks 9ᵈ being another pair.

A pair of fasteners 10, each made of wire, are used to secure the snout strap in position upon the U-frame. For this purpose the fasteners are placed loosely upon the U-frame, and the snout strap is then threaded through the fasteners. These fasteners 10, thus carrying the snout strap 5, can be shifted relative to the U-frame, so as to engage either the two kinks 9ᶜ or the two kinks 9ᵈ. By thus shifting the fasteners 10, the general position of the snout strap relative to the U-frame can be changed, the muzzle being to this extent adjustable.

The neck strap 7 is secured to the U-frame by a pair of fasteners 11, which in this instance are of the same form as the fasteners 10 above described.

A dog's head appears at 12, the snout being shown at 14 and a part of the neck at 13.

The operation of my device is as follows:

The various mechanical parts being assembled and arranged as described, the dog's snout is thrust through the snout strap 5, the neck strap being brought around the animal's neck 13 and fastened by aid of the buckle 8.

Both the snout strap and the neck strap are now adjusted, so as to allow the dog a considerable degree of comfort and freedom.

The precise fitting of the muzzle is a matter which may be varied by conditions and circumstances, even for the same individual dog, and of course the adjustments of the same individual muzzle may be different for different dogs.

With the muzzle fitted in position and properly adjusted, the bow-shaped portion 9ᵇ of the U-frame is directly in front of the dog's snout, a trifle lower than the level of the upper teeth, and spaced therefrom about an inch, more or less, depending upon the size of the dog.

The dog can now open his mouth and thrust out his tongue. Thus he may pant freely, lap up liquids, and eat ordinary food, or even grass, which is nowadays considered nature's medicine for the dog.

The ability of a dog to thrust out his tongue freely is a factor which tends greatly to promote his comfort and health. This is because the dog's prespiration takes place in great measure through the medium of his tongue.

Under normal conditions of use, or in other words so long as the dog is not vicious, he has considerable freedom and comfort, in that the nose strap is quite loose and does not materially interfere with proper and legitimate motions of his jaws.

I will next discuss what happens in the event the dog becomes angry and attempts to do mischief by biting; and in this connection I will call attention to the manner in which any dog usually acts when dangerously angry.

First he is apt to growl and snarl, many of his muscles become tense, and he partially opens his mouth, his lower jaw becomes rigid and slightly protruding. If at the time these actions take place the dog is wearing my muzzle, the muscular movements of his jaws, face and neck, and particularly the partial opening of his mouth and the rigid setting of the under jaw, cause the nose strap to become taut, or even moderately tight.

The dog next springs forward, throwing his mouth open as far as the nose strap allows, and closing it with a snap—these three actions being executed with wonderful quickness. His forward leap, directed I will say at a person's leg, drives the bow-shaped portion 9ᵇ of the U-frame directly against the person's leg. This abruptly stops the forward travel of the U-frame, and virtually drives the U-frame backward relative to the dog's head.

Hence the nose strap 5 is distorted as indicated in Fig. 2, and tightened with a sudden jerk, so that the dog's mouth is closed abruptly, by the virtually automatic action of the nose strap. This positive closure of the dog's mouth takes place at a critical moment, and effectively prevents the dog from biting. Moreover, it serves as a mechanical rebuke to the dog, and affects him in much the same manner as if he had received a kick in the ribs from some unexpected quarter. He now seems to realize instinctively that his effort to bite has ended in failure, and instantly his anger gives way to fear, causing him to slink away. In any event his intended victim escapes unhurt.

In view of the foregoing explanations, a glance at Fig. 2 will show that the positive closure of the dog's mouth, under the conditions mentioned, is inevitable. The dog's head being driven forward and the U-frame being stopped in its forward travel, and the snout strap being already taut, the sudden jerk upon the snout strap, through the agency of the U-frame must force the dog's jaws to close—the force thus applied in the closure of the jaws being considerable.

It will be noted also that the muzzle has a wide range of adaptability. The straps can of course be adjusted further by shifting the fastenings 10, 11, relative to them. Again the snout strap 5, with the fastenings 10, may as a unit be shifted relative to the U-frame, so as to obtain still another adjustment, as above described and as may be understood from Fig. 3.

It will be noted that the muzzle comprises very few pieces, and that aside from the straps these pieces can each be made of wire. Moreover, as short lengths of wire can be used, scrap wire can be worked up for the purpose if occasion so requires.

I do not limit myself to the precise mechanism shown, as variations may be made therefrom and yet fall within my invention the scope of which is commensurate with my claims.

I claim—

1. A dog muzzle, comprising a frame made of a single integral length of wire, said wire frame bent to fit sides of head and form a U distant in front of and a little below the upper teeth, said wire frame to engage an adjustable neck strap near the ends of said wire frame, means for connecting the U-frame and neck strap, said neck strap to have a fixed position relative to the horizontal plane of said wire frame, said neck strap permitted to have a sliding movement on the length of said wire frame, said neck strap to fit snugly around the dog's neck, said wire frame to engage a nose strap, said wire frame to have a fixed position relative to said nose strap, said nose strap to have an adjustable position relative to said wire frame, said nose strap to fit loosely around dog's snout, said nose strap to have an adjustable circumference, not permitted to expand after adjustment.

2. A muzzle comprising a wire frame having a portion bent in order to fit upon opposite sides of a dog's nose and jaws, said portion being bent to form kinks, fastenings carried by said wire frame and each movable from one of said kinks to another, and a nose strap engaging said fastenings and movable therewith relative to said wire frame.

3. A dog muzzle, comprising a U-frame, a neck strap, a nose strap and wire fasteners for said neck strap and said nose strap, said wire fasteners being made of light wire formed into oblong members, said oblong members being of the size to permit said straps to be doubled and passed through said oblong members, and the loop of the said strap engaging said wire U-frame, other fasteners mounted upon said wire frame, and a nose strap engaging said last mentioned fasteners.

4. A muzzle comprising a U-frame made of a single integral member of wire, a strap mounted upon said U-frame and adjustable in the direction of its length, a pair of fastenings for said strap and U-frame mounted upon said U-frame, said U-frame being provided with means for holding the fastenings in different positions along the length of said U-frame, and a second strap engaging a second pair of fastenings on the rear end of said U-frame, and movable relative thereto by the rearward shifting movement of said frame.

HENRY LESPINASSE STOKER.